United States Patent Office 2,814,969
Patented Dec. 3, 1957

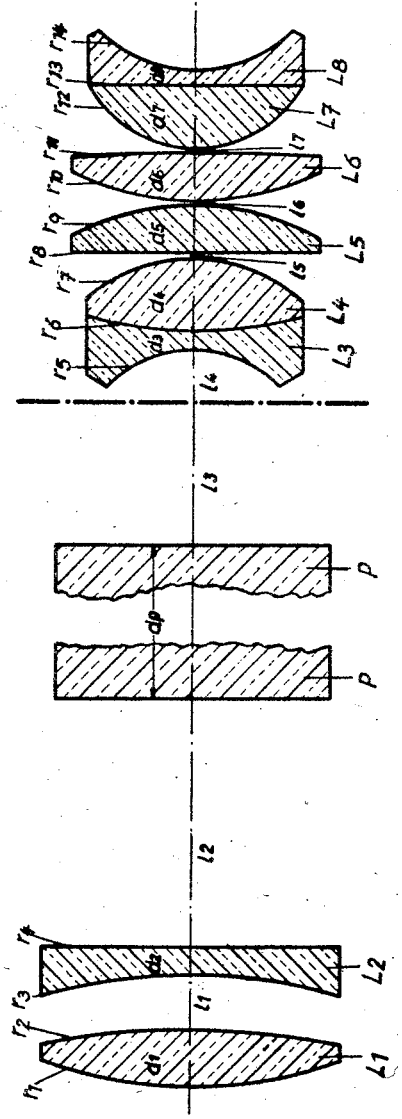

2,814,969

PRISM FIELD GLASS

Horst Köhler, Heidenheim (Brenz), Germany, assignor to Carl Zeiss, Heidenheim (Brenz), Wurttemberg, Germany Application March 15, 1955, Serial No. 494,305

2 Claims. (Cl. 88—57)

Object of the prior patent (application Ser. No. 371,765, now Patent No. 2,764,064) is a lens system for prism field glasses in which collective oculars are employed, which consists of a single collective front element of biconvex shape and of a single dispersive rear element of meniscus shape with its concave side turned towards said front element, which elements are separated from one another by an air space which amounts to at least 3% and at most 10% of the objective focal length. Objectives of this kind possess a positive chromatic magnification difference. This defect can be eliminated to a great extent in the objective itself thereby that the front element is constructed of two lenses. This to be sure entails an increase of the expenditure. A further possibility, namely the compensation of the defect through the ocular, generally encounters difficulties since most oculars, but especially those which yield specially good field correction, in general precisely possess a negative chromatic magnification difference. However, for compensation an ocular with positive magnification difference would be required. In accordance with the invention this disadvantage is avoided thereby, that the prisms are constructed of a glass in which the quotient $$\frac{n_F - n_C}{n_D^2}$$

is greater than 0.0055, whereby $n_F$, $n_C$, and $n_D$ indicate the refractive indices for the Fraunhofer lines F, C, and D.

The effect of the measure in accordance with the invention depends on the following consideration. A prism of the thickness $d$ effects a chromatic overcorrection, i. e. a difference in focal intercept, for example between the Fraunhofer lines F and C, by the amount $$\Delta s' = s_F' - s_C' = d \cdot \frac{n_F - n_C}{n_D^2}$$

If this chromatic longitudinal deviation is eliminated by corresponding dimensioning of the radii, then there remains an undercorrection of the focal length by this amount, which results in a chromatic difference in magnification. In the hitherto familiar prism field glasses a crown glass was employed in which the amount $$\frac{n_F - n_C}{n_D^2}$$

is about 0.004. Now in accordance with the invention a glass, preferably a flint glass, is to be used for the prisms, in which the amount $$\frac{n_F - n_C}{n_D^2}$$

is greater than 0.0055. This entails a correspondingly greater undercorrection of the chromatic magnification difference of the total system.

The effect of improving the chromatic correction in field glasses can be further supported by providing oculars with thick meniscus-shaped, strongly bent outer elements turning their concave sides outwards, which oculars from the outset have a relatively great negative chromatic magnification difference, and by having the meniscus-shaped outer element facing the eye composed of two cemented lenses, the reciprocal value of the cement radius in this meniscus facing the eye being selected within the limits of $-\frac{1}{15}$ and $+\frac{1}{2}$ of the ocular focal length. This dimensioning of the oculars effects a less negative chromatic magnification difference in the ocular.

In the figure of the illustration an example of the invention for a field glass with 8-times magnification is represented and constructed in accordance with the numerical values of the following table. The numerical values refer to an objective focal length of 100 units of length.

Herein are indicated by:

L the individual lenses
r the radii
d the lens thicknesses
l the air intervals
$n_D$ the refractive indices for the glass sorts
$v$ the values of the Abbe number

*Example*

| Lenses | Radii | Thicknesses and Distances | $n_d$ | $v_d$ | Glass sort |
|---|---|---|---|---|---|
| $L_1$ | $r_1 = +44.679$ | $d_1 = 5.7$ | 1.6074 | 56.7 | SK 2 |
|  | $r_2 = -75.008$ | $l_1 = 5.43$ |  |  |  |
| $L_2$ | $r_3 = -52.343$ | $d_2 = 2.83$ | 1.6889 | 31.1 | SF 8 |
|  | $r_4 = +1830.7$ | $l_2 = 24.0$ |  |  |  |
| P (Prism) |  | $d_p = 74.6$ | 1.6200 | 36.3 | F 2 |
| Image plane |  | $l_3 = 14.0$ |  |  |  |
|  | $r_5 = -12.413$ | $l_4 = 5.41$ |  |  |  |
| $L_3$ |  | $d_3 = 1.5$ | 1.7283 | 28.3 | SF 10 |
| $L_4$ | $r_6 = +41.577$ | $d_4 = 7.5$ | 1.6074 | 56.7 | SK 2 |
|  | $r_7 = -16.552$ | $l_5 = 0.0944$ |  |  |  |
| $L_5$ | $r_8 = +294.34$ | $d_5 = 4.9$ | 1.6204 | 60.3 | SK 16 |
|  | $r_9 = -26.233$ | $l_6 = 0.0944$ |  |  |  |
| $L_6$ | $r_{10} = +29.014$ | $d_6 = 4.9$ | 1.6230 | 58.1 | SK 15 |
|  | $r_{11} = -129.60$ | $l_7 = 0.0944$ |  |  |  |
| $L_7$ | $r_{12} = +12.592$ | $d_7 = 6.5$ | 1.5918 | 58.2 | SK 13 |
| $L_8$ | $r_{13} = \infty$ | $d_8 = 1.4$ | 1.7618 | 26.5 | SF 14 |
|  | $r_{14} = +14.128$ |  |  |  |  |

I claim:

1. Prism field glass optical system with collective ocular members, objective lens systems and prism means arranged in optical alignment between said ocular members and said objective lens systems respectively, said ocular members having strongly bent meniscus shaped outer components which turn their concave surfaces outwards, of which components at least the outer component facing the observer's eye is composed of two cemented lenses, said objective lens systems being of the telephoto type and comprising two axially air separated components and consisting of a single positive front biconvex lens element and a rear negative meniscus shaped lens element having its concave side turned towards the said positive front lens element, the focal length of the positive front lens element and the focal length of the rear negative meniscus lens element being so related that the two said lens elements are axially separated apart by an air space amounting at least to 3% and at most 10% of the focal length of the whole objective, and the focal intercept of the focal point of the vertex of the rear lens element facing the said prism means is at least 75% and at most 90% of the focal length of the whole objective, whereby the rear principal focal plane of the system is displaced forwards of the objective in the direction towards the object, said prism means consisting of a glass in which the quotient $$\frac{n_F - n_C}{n_D^2}$$

is greater than .0055, whereby $n_F$, $n_C$ and $n_D$ indicate the refractive indices of the Fraunhofer lines F, C and D.

2. Prism field glass optical system according to claim 1, in which the reciprocal value of the radius of the cemented surface in the outer meniscus facing the observer's eye, of the ocular is selected within the limits of $-1/15$ to $+1/2$ of the ocular focal length.

References Cited in the file of this patent

UNITED STATES PATENTS

| | | |
|---|---|---|
| 1,468,762 | Taylor et al. | Sept. 25, 1923 |
| 2,015,527 | Konig | Sept. 24, 1935 |
| 2,549,158 | Bertele | Apr. 17, 1951 |
| 2,621,564 | Bertele | Dec. 16, 1952 |

FOREIGN PATENTS

| | | |
|---|---|---|
| 499,992 | Germany | June 25, 1930 |
| 501,456 | Germany | July 14, 1930 |
| 236,612 | Switzerland | July 2, 1945 |
| 847,215 | Germany | Aug. 21, 1952 |
| 861,469 | Germany | Jan. 5, 1953 |